E. C. PAYNE.
DEVICE FOR MEASURING HEIGHTS OF TREES AND THE LIKE.
APPLICATION FILED JULY 3, 1913.
1,253,877.
Patented Jan. 15, 1918.
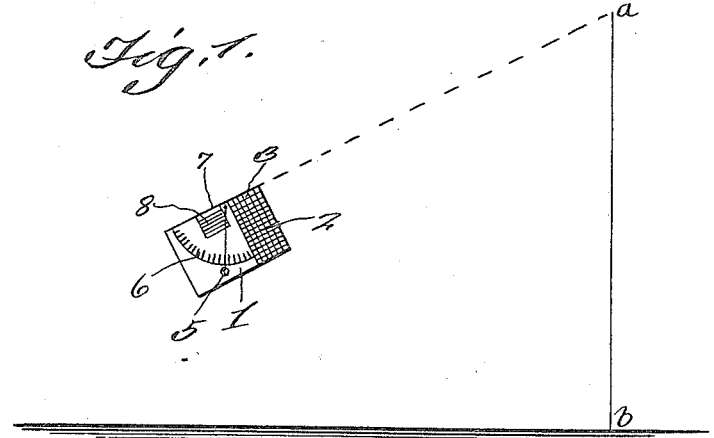
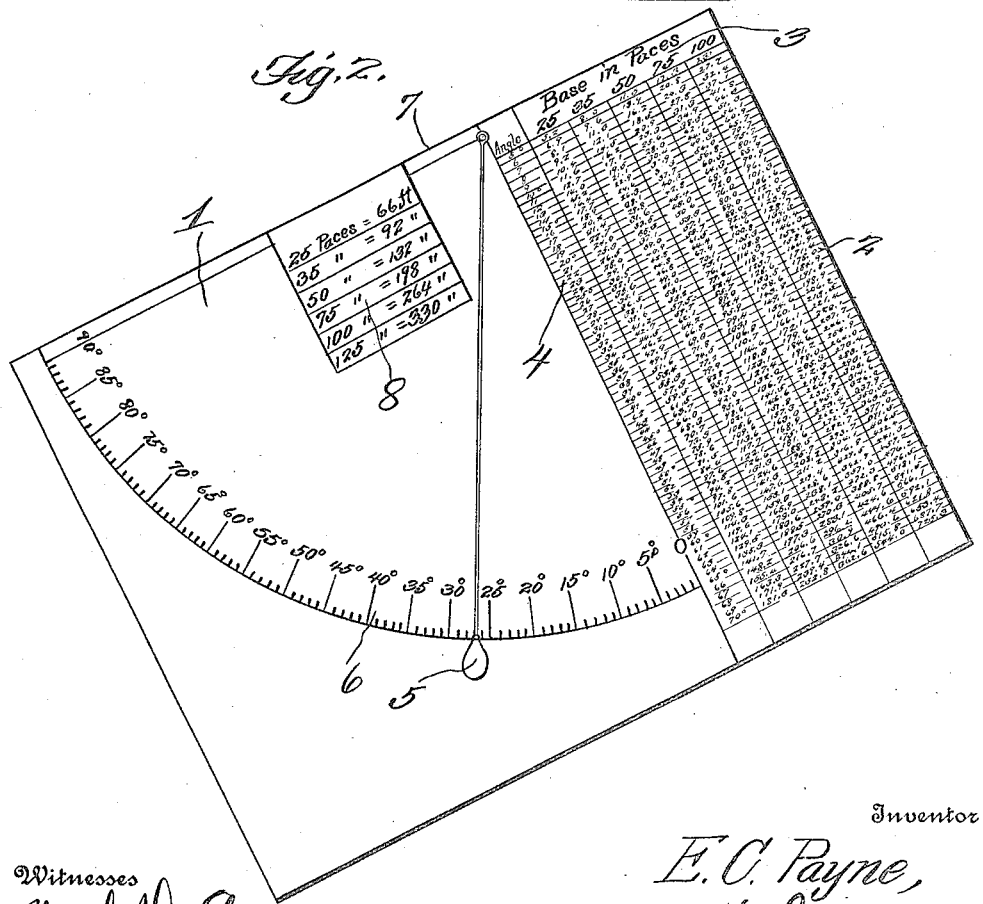
Witnesses
Mark DeGrange
Inventor
E. C. Payne,
By D. Swift &c.,
his Attorneys

UNITED STATES PATENT OFFICE.

EDWIN C. PAYNE, OF TACOMA, WASHINGTON.

DEVICE FOR MEASURING HEIGHTS OF TREES AND THE LIKE.

1,253,877.   Specification of Letters Patent.   Patented Jan. 15, 1918.

Application filed July 3, 1913. Serial No. 777,277.

*To all whom it may concern:*

Be it known that I, EDWIN C. PAYNE, a citizen of the United States, residing at Tacoma, in the county of Pierce and State of Washington, have invented a new and useful Device for Measuring Heights of Trees and the like; and I do hereby declare the following to be a full, clear, and exact description of the invention, such as will enable others skilled in the art to which it appertains to make and use the same.

This invention relates to a new and useful improved device for measuring heights of trees.

One of the features of the invention is the provision of card board or a sheet metal plate having a graduated quarter arc with the angles marked in degrees, say for instance, from zero to ninety (90) degrees, in combination with a plumb bob or pendulum, there being a table upon the card board or plate giving heights of various trees with respect to so many paces from the base of a tree, the angle having been determined by sighting along the upper edge of the plate.

The invention comprises further features and combination of parts, as hereinafter set forth, shown in the drawings and claimed.

In the drawings:—

Figure 1 is a view of the plate, as being held in the proper position for measuring the height or the distance between the points *a* and *b*.

Fig. 2 is an enlarged detail view of the device.

Referring more particularly to the drawings, 1 designates a card board or sheet metal plate having a table 2 at one end giving various heights in feet and tenths arranged in columns according to the number of paces shown at 3 as stepped off from the base of a tree or other object to be measured, there being an angle column 4, giving the various angles, according to where the plumb bob or pendulum 5 locates with respect to the graduated arc 6, when sighting along the upper edge 7 of the card board or plate to the top of a tree or other object, that is, at the end of the paces stepped off from the base of the object. The card board or plate is provided with a table of paces and feet designated by the numeral 8.

To find the height of a tree or other object, the idea is to pace off any distance from the tree, say for instance, twenty-five, thirty-five, fifty, seventy-five or a hundred paces. Hold the card board or plate in the left hand with the graduated face thereof facing toward the right, then sight over the top edge 7 of the card board to the top of the object to be measured, allowing the plumb bob or pendulum to swing freely but close to the graduated quarter arc. After sighting and having the upper edge 7 alined with the top of the object to be measured, hold the plumb bob or pendulum against the card with the thumb and finger of the right hand, then read the angle on the graduated arc. Find the same angle in the angle column 4, then if the operator has paced off thirty-five paces, the height of the object to be measured will be found in the column under thirty-five paces, opposite the angle given on the graduated arc, that is, where the plumb bob has been held by the right hand.

For example pace off thirty-five paces from a base of a tree, and the graduated arc or scale will show an angle of 47 degrees. 47 degrees will then be found in the angle column, and opposite the 47 degrees, under 35 paces, 98.6 feet will be found, which is the height of the object measured.

In rough or mountainous countries, it is not always convenient or possible to get within a range of 75 or 100 paces, and still be on a level with the foot of the tree. In a case where the cruiser is below the foot of the tree, the card board or plate is to be held in the left hand as before stated, and the angle measured up to the foot of the tree. This distance having been noted, the angle is then measured to the top of the tree, and when this height is found the first height is deducted from it, which will give the proper height of the tree or other object.

For example, pace off a distance of 75 paces from the tree and sight along the upper edge 7 of the card board to the foot of the tree, which will be seven (7) degrees, and opposite 7 degrees in the angle column, under 75 in the paces column, 24.3 feet will be found. Then sight along the upper edge 7 of the card board to the top of the tree, finding the angle to be 55 degrees, and opposite 55 degrees in the angle column under 75 in the pace column 282.7 feet will be noted, from which the first calculation (24.3 feet) is deducted leaving 258.4 feet, the exact height of the tree.

When the cruiser is above the foot of the tree, the card board or scale is held in his right hand with the graduated side facing his left. The angle from the upper edge 7 of the card board to the foot of the tree is then read on the graduated quarter arc and noted. The scale or card board is then reversed to the original position in the left hand, and the angle measured to the top of the tree, after which the two heights are added, which gives the exact height of the tree.

Example: Pace off 50 paces from the tree, read the angle down to the foot of the tree as being 6 degrees, and opposite 6 degrees in the angle column under 50 in the pace column, 13.9 feet will be found; then reverse the scale and find the angle to the top of the tree by sighting along the upper edge 7 of the card board, giving 42 degrees, and opposite 42 in the angle column under 50 in the pace column, 118.8 feet will be found, to which add 13.9 feet, making a total of 132.7 feet, the exact height of the tree or other object.

The invention having been set forth, what is claimed as new and useful is:—

In a device for measuring heights, the combination with a chart member having a straight sighting edge to aline from the eye with the top of the object, the height of which is to be measured from points at different numbers of paces distant from the base of the object, said member having a quarter arc printed on one face thereof, said arc provided with degree graduations from zero to ninety degrees, of a pendulum suspended from the member concentric with the arc to coöperate with the graduations thereof, to determine the angle which the sighting edge of the member makes with the horizon, said short member having a table on the same face with the arc, giving the computations involving said number of paces and the angles the sighting edge makes with the horizon, of heights of objects to be measured.

In testimony whereof I have signed my name to this specification in the presence of two subscribing witnesses.

EDWIN C. PAYNE.

Witnesses:
HERBERT S. GRIEGS,
C. E. STEVENS.

Copies of this patent may be obtained for five cents each, by addressing the "Commissioner of Patents, Washington, D. C."